United States Patent [19]
Anderson et al.

[11] 3,896,668
[45] July 29, 1975

[54] METHODS AND APPARATUS FOR DETERMINING CHARACTERISTICS OF SUBSURFACE EARTH FORMATIONS

[75] Inventors: Ronald A. Anderson; Maurice P. Tixier, both of Houston, Tex.

[73] Assignee: Schlumberger Technology Corporation, New York, N.Y.

[22] Filed: Oct. 5, 1973

[21] Appl. No.: 403,786

[52] U.S. Cl. .................................................. 73/152
[51] Int. Cl............................................. E21b 49/00
[58] Field of Search ............ 73/151, 152; 235/151.3

[56] References Cited
UNITED STATES PATENTS
3,761,701   9/1973   Wilder et al...................... 73/151 X
3,820,390   6/1974   Forgotson............................ 73/152

*Primary Examiner*—Jerry W. Myracle
*Attorney, Agent, or Firm*—Amster & Rothstein

[57] ABSTRACT

In accordance with illustrative embodiments of the present invention, measurements of a plurality of earth formation parameters are combined to enable interpretation of the mechanical properties of the formations surrounding a borehole. Information concerning the mechanical properties of the formation may then be used for identifying mechanically competent formations.

More particularly, sonic and density measurements are obtained and combined in a manner to provide data indicative of certain formation elastic moduli. These moduli, such as shear modulus and bulk compressibility of the formation provide an indication of the formation strength.

14 Claims, 10 Drawing Figures

PATENTED JUL 29 1975  3,896,668

SHEET 1

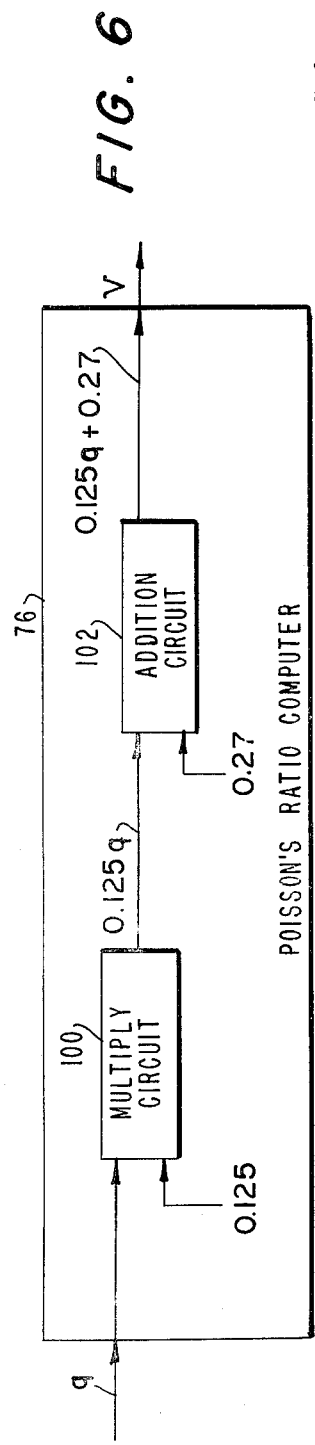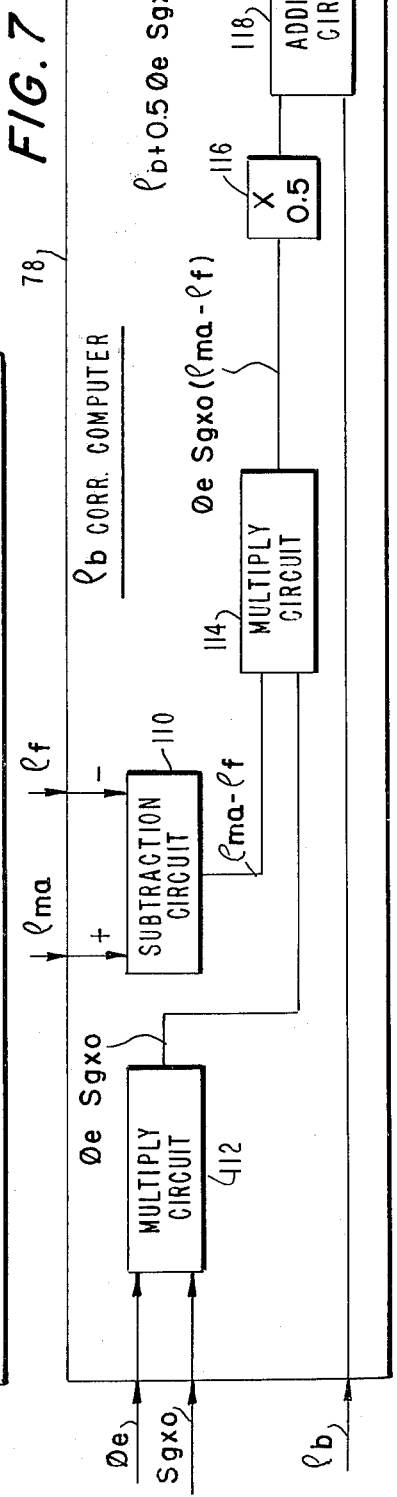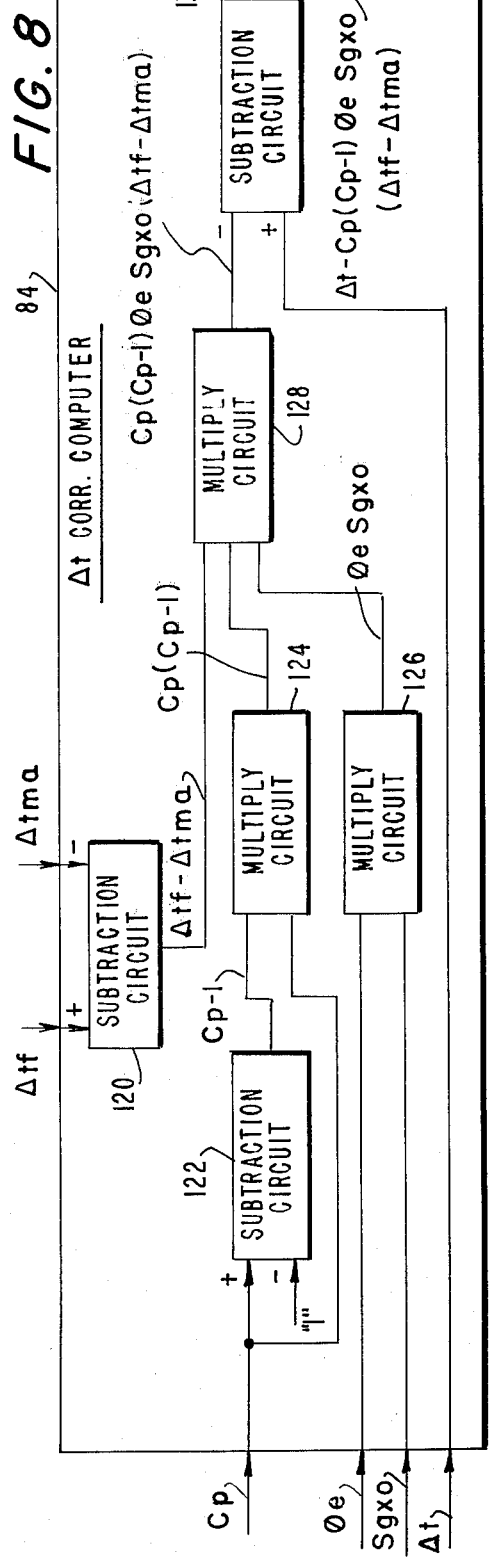

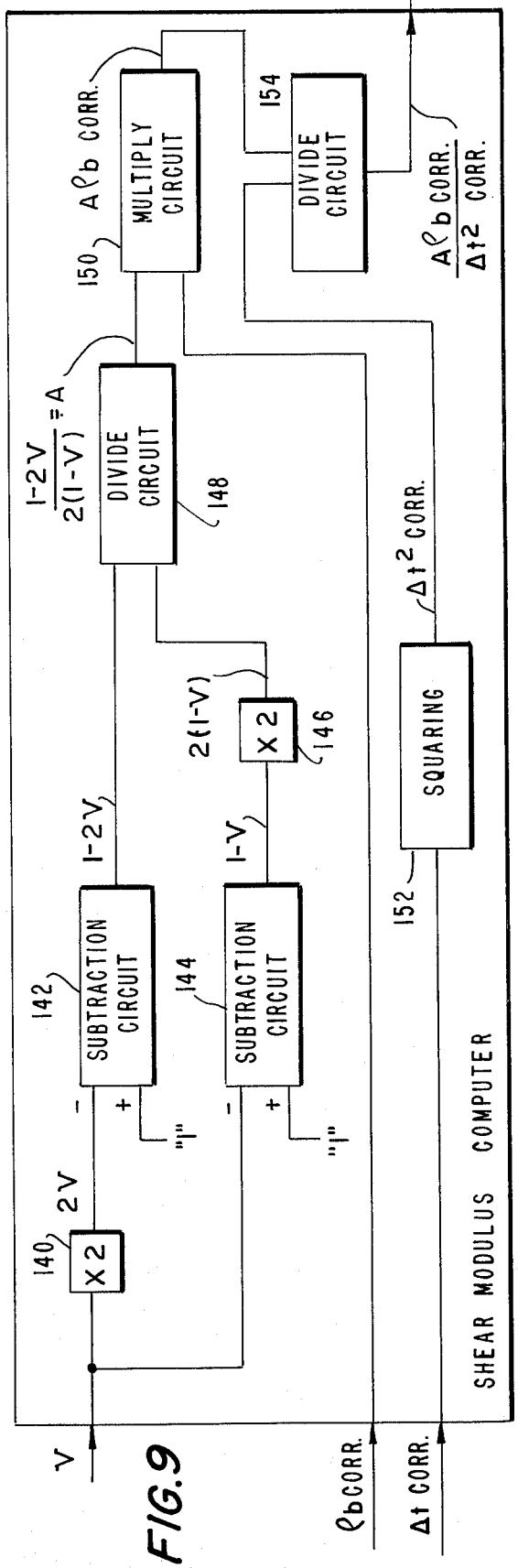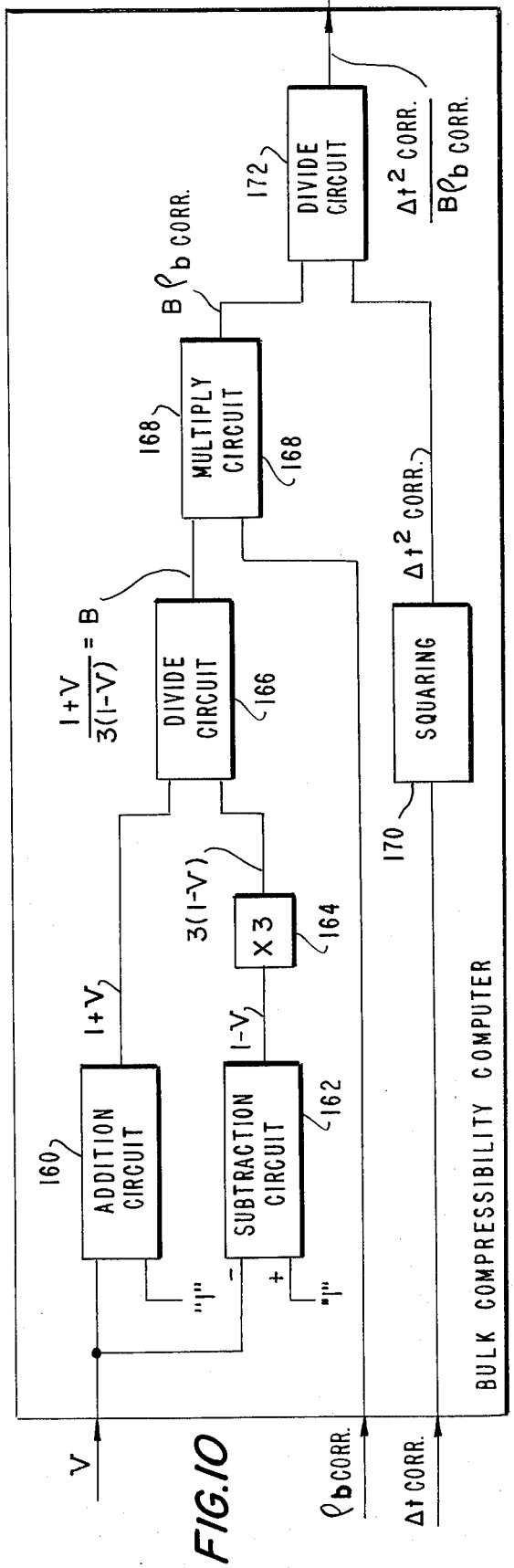

METHODS AND APPARATUS FOR DETERMINING CHARACTERISTICS OF SUBSURFACE EARTH FORMATIONS

BACKGROUND OF THE INVENTION

1. Field of the Invention

The control of sand production in a well is a problem that has been with the oil industry for a very long time. Experience indicates that sanding problems are directly related to production rates of the well. Therefore, the problem of sanding has become more critical lately since proration control by the government has been substantially eliminated due to shortages. Consequently, the oil companies are concerned with substantially increasing production of their wells. In face, the government is actually requiring an increase of production in Federal waters. It is therefore apparent that oil producing companies would like to know the maximum rate at which they can produce without sanding from wells in which no consolidation or gravelpack has been used. Furthermore, oil companies would be very interested in knowing which wells requie gravelpacking or consolidation from the very beginning of production, so that control measures can be instituted from the start. Since there are friable sand reservoirs in known sand producing areas from which economically attractive production rates may be obtained without the use of any form of sand control, it is desirable that some means for distinguishing or predicting those competent sand formations from incompetent sand formations be available so that sand controlling techniques such as gravelpacking or plasticizing may be avoided when unnecessary, or, on the other hand, may be resorted to before sanding problems develop in those formations where such sand control is necessary.

2. Description of the Prior Art

In seeking information concerning zones bearing hydrocarbons such as oil and gas that may exist in subsurface earth formations adjacent a borehole drilled into these formations, various types of exploring devices are typically lowered into the borehole for measuring selective properties of the formations adjacent the borehole. Three principal types of such exploring devices are a) electrical exploring devices (using either electrodes or induction coils), b) sonic exploring devices, and c) radioactivity exploring devices.

The electrical exploring devices measure the eletrical resistivity or conductivity of the earth formations. Such electrical resistivity is determined primarily by the amount, distribution and resistivity of the fluids contained in the formation core spaces. The sonic exploring devices, on the other hand, measure the time required for sonic waves to travel across a given span of the earth formation which is related to the sonic velocity in the formation. This sonic velocity is determined primarily by the nature of the rock matrix and the state of confining stress and the type of fluid in the pore space.

The radioactivity exploring devices measure either the natural radioactivity of the formation or the radioactivity induced therein by bombardment of the formation with radioactivity particles or rays. Two particular radioactivity exploring devices used to investigate formations are the formation density logging tool and the neutron logging tool. The formation density logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases.

The neutron tool on the other hand, utilizes a source for emitting neutrons into adjacent formations. In one form of neutron device, these neutrons lose energy by collision with atoms of the formation. When the energy level of these neutrons is reduced to the epithermal energy range, they can be detected by a nearby detector which counts the number of epithermal neutrons. Since hydrogen atoms are the only ones whose weights are almost equal to that of the neutron, they are the most effective in reducing the energy level off the neutrons to enable their capture. Thus, it can be said that this type of neutron log is essentially a record of the hydrogen atom density of the rocks surrounding the borehole. Since the formation pore spaces are generally filled with water or fluid hydrocarbons, both of which have about the same amount of hydrogen, a neutron log does not distinguish between oil and water, but is primarily affected by the formation porosity. Gas, on the other hand, will alter this porosity determination by the neutron log.

In general, none of the electrical, acoustic, or radioactivity measurements taken alone give all of the required information concerning the hydrocarbons in the formations or the characteristics of those formations. The various factors which affect each measurement are taken into account and then an interpretation or deduction is made as to the probable characteristics of the formations.

There is considerable experimental evidence which indicates that there is a correlation between the intrinsic strength of a formation and the dynamic elastic constants of the formation as determined from sonic velocity and density measurements. One technique which attempts to predict the competency of sand and thereby also predict the maximum rate at which a which a well may be produced is described in a paper, "Estimation of Maximum Production Rates from Friable Sandstones Without Using Sand Control Measures," by N. Stein and V. W. Hilchie, Paper No. SPE 3499 published by the American Institute of Mining, Metallurgical and Petroleum Engineers Inc., Copyright 1971. According to this paper, the shear modulus is the most important elastic constant for predicting sanding problems, however, the technique described in the paper is based on assumption that the bulk modulus is constant throughout the formation. In general, the bulk modulus varies throughout the formation and this technique would not provide accurate results.

It is possible to obtain mechanical properties or elastic constants of the formation, such as the shear modulus and bulk modulus (or bulk compressibility) from the sonic shear and compressional velocities and the bulk density measurement. The sonic compressional velocity which is readily measured, is generally referred to as the acoustic travel time of the formation and is measured as described above. The sonic shear velocity, on the other hand, is highly attenuated and its velocity approaches the velocity of the fluid in the formation. Shear arrivals are often masked in the sonic wave trains.

Accordingly this invention is directed to a new technique for combining measurements from earth formations to determine the elastic constants or mechanical properties of the formation and utilizing these results to indicate the strength of the formation.

SUMMARY OF THE INVENTION

In accordance with the invention, the elastic constants of the formation are determined from well-logging measurements. These are combined to determine the shaliness index, which is used to compute Poisson's ratio. Well-logging measurements are combined with Poisson's ratio to compute the elastic constants.

In the preferred embodiment of the invention the well-logging measurements include the acoustic travel time and the bulk density which are corrected for the presence of hydrocarbons. The elastic constants obtained are the shear modulus, the bulk compressibility, and the ratio of the shear modulus to the bulk compressibility. These elastic constants have been found to provide valuable information regarding the strength of the formation. The invention can be carried out using an appropriately programmed general purpose digital computer or a special purpose analog computer.

BRIEF DESCRIPTION OF THE DRAWINGS

FIGS. 5-10 are diagramatic representations of a special purpose analog computer for practicing the invention.

DESCRIPTION OF THE PREFERRED EMBODIMENT

Figure 1:
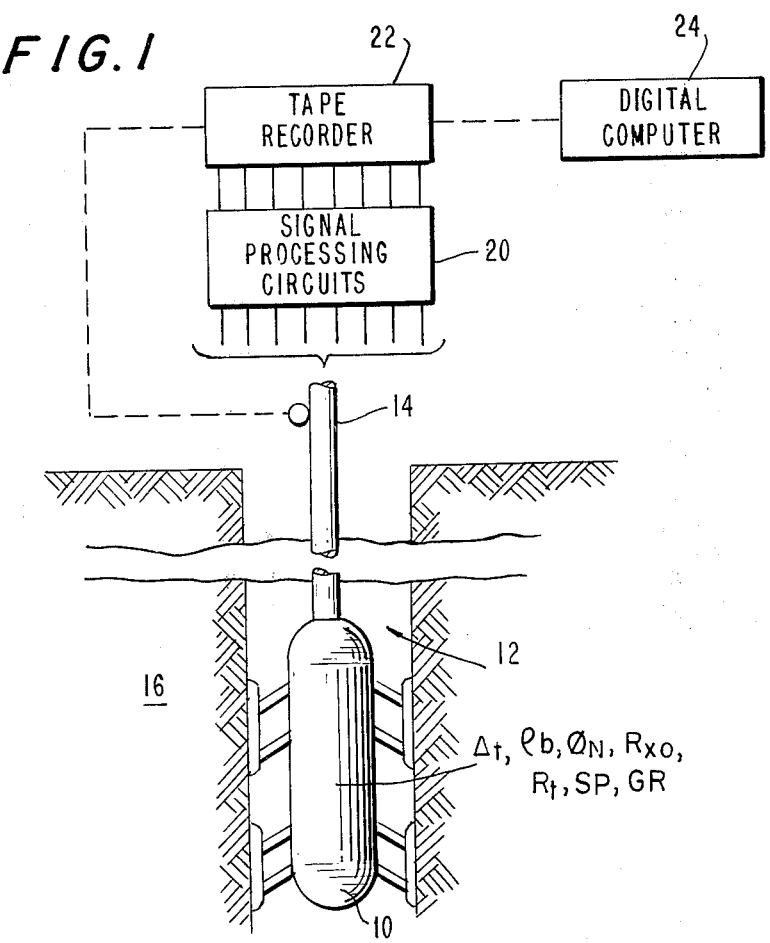
FIG. 1 shows an investigating apparatus suspended in a borehole for deriving a plurality of well-logging measurements and a schematic representation of apparatus for processing these well-logging measurements.

REferring to FIG. 1, there is shown an investigating apparatus 10 located in a borehole 12 on the end of multiconductor cable 14 which is raised and lowered in borehole 12 drilled into earth formation 16 by a suitable winch mechanism (not shown). Investigating apparatus 10 includes exploring devices for obtaining measurements of the acoustic travel time $\Delta t$, bulk density $\rho_b$, deep and shallow resistivities, $R_t$ and $R_{Xo}$, spontaneous potential, SP, porosity, $\phi_n$, derived room a neutron exploring device and the natural gamma ray count, GR, of the formation.

Measurement signals derived from the exploring device 10 are transmitted to the suitable signal processing circuits 20 at the surface of the earth. The signal processing circuits convert the well logging signals to digital form for temporary storage by way of a digital tape recorder 22 for application to a computer 24 which is programmed in accordance with the teachings of the present invention to process the data in a manner to provide valuable information relative to the nature of the earth formations. It should be appreciated at this point that the digital computer 24 could either be a truck mounted computer for operation at the well site, or the data could be transmitted via telephone communication or other technique to a computer located some distance away. If the data was recorded on a magnetic tape by way of tape recorder 22, of course, the tape containing the data could be simply directly transported to the distant computer for processing. While the measurements to be used in practicing the present invention are shown in FIG. 1 as having been derived from one exploring device, it should also be understood that these measurements could be derived from a plurality of exploring devices which are run through the borehole at different times. In this event, the data from each run would be recorded on individual magnetic tapes and the total datta would then be merged for use by digital computer 24. Such merging may preferrably be accomplished by merging all of the data on a single tape for processing by the digital computer. Alternatively, the data could be processed using a special purpose analog computer.

An acoustic exploring device for deriving a measurement for $\Delta t$ can be found in U.S. Pat. No. 3,231,041 granted to F. P. Kokesh on Jan. 25, 1966. An exploring device for obtaining the measure of the bulk density can be found in U.S. Pat. No. 3,321,625 granted May 23, 1967 to John F. Wall. An exploring device for obtaining resistivity measurements and measurements of the spontaneous potential can be found in U.S. Pat. No. 3,053,530 granted to G. Attali on July 1, 1969. An example of an exploring device for obtaining a neutron porosity log measurement can be found in U.S. Pat. No. 2,769,918 granted to C. W. Tittle on Nov. 6, 1956.

The neutron tool responds to the amount of hydrogen in the formation and is essentially a record of the hydrogen atom density in the rocks surrounding the borehole. Liquid hydrocarbons have hydrogen indexes close to that of water and neutron measurements in these formations are primarily affected by porosity. Gas, however, usually has a considerably lower hydrogen concentration which varies with temperature and pressure. Therefore, when gas is present near enough to the borehole to be within its zone of investigation, a neutron log does not provide an accurate measure of formation porosity.

In addition to deriving a measure of formation porosity from the neutron tool, the bulk density and acoustic travel time measurements can also be converted to measurements of formation porosity. The bulk density measurement can be converted to a porosity measurement if the matrix density, $\rho ma$ and fluid density $\rho f$ are known. The equation for converting this bulk density measurement to a porosity measurement is:

$$\phi_D = \frac{\rho ma - \rho b}{\rho ma - \rho f} \quad (1)$$

See pages 43 and 44, "Log Interpretation Principles" published by Schlumberger Limited, New York, N.Y. 10017 which is incorporated herein by reference. Common values of $\rho ma$ for various formations are:

2.71 for limestone
2.87 for dolmite

In water sands, the fluid density $\rho f$ is usually set equal to 1. However, in light hydrocarbon and gas bearing formations, the fluid density $\rho f$ will be less than one, and thus the value of porosity $\phi_D$ derived from the density tool will be higher than the true porosity.

The acoustic travel time $\Delta t$ can also be converted to a measure of porosity provided the acoustic travel time of the rock matrix and fluid, $\Delta t_{ma}$ and $\Delta t_f$ respectively are also known. The relationship of the acoustic or sonic derived porosity in terms of $\Delta t$ is:

$$\phi_s = \frac{\Delta t - \Delta t_{ma}}{\Delta t_f - \Delta t_{ma}} \qquad (2)$$

See pages 36 and 37. "Log Interpretation Principles," heretofore mentioned.

The spontaneous potential measurement provided by the exploring apparatus 10 is the difference between the potential of an electrode on the exploring device and the potential of an electrode located at the surface of the earth. Opposite shale formations, spontaneous potential will usually remain fairly constant and thus tend to follow a straight line on the log, called the "Shale Base Line." Opposite permeable formations the spontaneous potential will show excursions from the shale base line. In thick permeable beds free of shale, the spontaneous potential will also reach an essentially constant value defined as the "Sand Line". For further information concerning the spontaneous potential measurement and its uses, see pages 7–12 of the referenced publication "Log Interpretation Principles."

In accordance with the invention, the acoustic travel time and shaliness of the sand in the formation are determined and used to compute the elastic constants or elastic moduli of the formation which, in turn, provide useful information regarding the strength of the formation. Further, these measurements are corrected for the presence of hydrocarbons.

Two elastic constants of interest are the shear modulus $G$, and bulk modulus, $K$ or bulk compressibility, $C_b = 1/K$. If the sonic compressional and shear transit times are known, together with the bulk density, the elastic constants can be obtained from the following relationships for homogeneous, isotropic formations:

$$G = \frac{\rho b}{\Delta t_s^2} \qquad (3)$$

$$\lambda + 2G = \frac{\rho b}{\Delta t_c^2} \qquad (4)$$

$$K = \frac{1}{C_b} = \frac{3\lambda = 2G}{3} = \rho b \left[ \frac{1}{\Delta t_c} - \frac{4}{3\Delta t_s^2} \right] \qquad (5)$$

where
- $G$ = shear modulus
- $\rho b$ = bulk density
- $t_s$ = shear transit time
- $\lambda$ = lame constant
- $t_c$ = compressional transit time
- $K$ = bulk modulus
- $C_b$ = bulk compressibility The values of $\rho_b$ and $\Delta t_s$ for Eqs. 3–5 are directly available from the Density and Sonic logs. However, as already noted, the value of $\Delta t_s$ is often difficult to evaluate.

After detailed investigation, it has been found that Poisson's ration can be related to the shaliness of the formation and that the elastic constants can be determined independently of the value of $\Delta t_s$. Poisson's ration, $\nu$, is related to the Lame constant, $\lambda$, and shear modulus, $G$, by the relation, $$\nu = \frac{\lambda}{1(\lambda + G)} \qquad (6)$$

Using Eqs. 3–6, the required relations can be written:

$$G = \frac{A\rho b}{\Delta t_c^2} \qquad (7)$$

$$K = \frac{1}{C_b} = \frac{B\rho b}{t_c^2} \qquad (8)$$

where:

$$A = \frac{1 - 2\nu}{2(1 - \nu)} \quad \text{and} \quad B = \frac{1 + \nu}{3(1 - \nu)}$$

The relation between Poisson's ratio and shaliness is given by the equation:

$$\nu = 0.125q + 0.27 \qquad (9)$$

where $q$ is the shaliness index defined as:

$$q = \frac{\phi_z - \phi_e}{\phi_z} \qquad (10)$$

where $\phi_z$ is the total space between the matrix grains supporting the overburden, and $\phi_e$ is the porosity available to water and hydrocarbons. The difference, $\phi_z - \phi_e$, is interpreted as the intergranular space occupied by dispersed shale and fine sands.

As discussed below, to arrive at values for $\phi_z$ and $\phi_e$ in the presence of hydrocarbons, a complete analysis of the formation is required. When hydrocarbons are not present, $\phi_z$ is equal to $\phi_S$, $\phi_e$ is equal to $\phi_D$, and Eq. 10 can be written as:

$$q = \frac{\phi_S - \phi_D}{\phi_S} \qquad (11)$$

Prior to obtaining the bulk compressibility and shear mudulus, the value for the shaliness index must be determined which, in the presence of hydrocarbons, requires a complete analysis of the formation. A technique for obtaining the value of $q$ the shaliness index, is set forth in detail in U.S. Pat. No. 3,638,484 issued on Feb. 1, 1972 to Tixier and assigned to Schlumberger Technology Corporation, and in a paper entitled "Log Evaluation of Low-Resistivity Pay Sands in the Gulf Coast" by M. P. Tixier, R. L. Morris and J. G. Connell, presented at the SPWLA Ninth Annual Logging Symposium, June 23rd–26th, 1968. Another technique is set forth in a pulbication entitled "Log Analysis of Sand-Shale Sequences — A Systematic Approach", by Poupon et al., published in the July, 1970 issue of the Journal of Petroleum Technology. In this publication, the shaliness index is represented as $V_{sh}$.

By utilizing the techniques fully explained in the Tixier patent and Tixier et al publication, values for $\phi_e$, $\phi_z$, $q$, $C_p$, the sonic compaction factor and $S_{oxo}$ the gas saturation near the borehole wall are obtained for each depth level in the formation. Since these techniques are fully explained in the above referenced patent and publication, they will not be discussed in detail herein.

The values of $q$ at each depth level thus obtained are then utilized, in equation 9 to compute Poisson's ratio which, in turn, is used in equations 7 and 8 to compute the bulk compressibility and the shear modulus of the formation at each depth level.

If a particular depth level under consideration contains hydrocarbons, corrections must be made for the derived values of the bulk density and sonic travel time, since hydrocarbons, particularly gas, increase the sonic travel time if the formation is uncompacted and also reduce the measured value of the formation bulk density. The combined effect is to decrease the shear modulus and increase the bulk compressibility compacted to values that would be obtained if the identical sand were saturated with water. Since the introduction of hydrocarbons should not reduce the intrinsic strength which is inferred from elastic constants of the formation, the values of the sonic transit time and bulk density are adjusted to values that would be obtained if all the fluid in the formation were water.

The corrected value for the sonic transit time is given by equation:

$$\Delta t_{corr} = \Delta t_{log} - C_p(C_p - 1) \phi_e S_{oxo} (\Delta t_f - \Delta t_{ma}) \quad (12)$$

Where: $\Delta t_{corr}$ is the value of $\Delta t$ that would be obtained for the same formation saturated with water and $\Delta t_{log}$ is the derived value of sonic transit time.

In gas, the bulk density, $\rho_b$ is corrected as follows:

$$\rho b_{corr} = \rho_{log} + 0.5 \phi_e S_{oxo} (\rho ma - \rho f) \quad (13)$$

Where: $\rho b_{corr}$ is the bulk density that would be obtained if water were the saturating fluid, and $\rho b_{log}$ is the value obtained from the density tool.

Another useful parameter is the ratio of shear modulus to bulk compressibility, $G/c_b$. The values of shear modulus, bulk compressibility and the ratio of these two values are important in determining the strength of a formation, including prediction of sanding in the formation. For example, it has been found that when the shear modulus is greater than $0.6 \times 10^6$ psi, sanding is not a problem. Similarly, the threshold value for bulk compressibility to avoid sanding is about $0.75 \times 10^{-6}$ square inch per/lb. The ratio of $G/c_b$ provides a greater range of sensitivity than either parameter when considered alone. A value of $G/c_b$ of $0.8 \times 10^{12}$ psi$^2$ provides a useful threshold level above which sanding is not expected to occur, providing the production is oil or gas. A higher threshold level may be required if the production has a high watercut.

In general, it has been found that very weak formations exhibit a shear modulus of as low as $0.4 \times 10^6$ psi whereas well-compacted formations may have a shear modulus in excess of $1.6 \times 10^6$ psi. The bulk compressibility may range from $1.3 \times 10^{-6}$ square inch/lb. for a weak formation to $0.25 \times 10^{-6}$ square inch/lb. for an extremely strong one.

Figure 2:
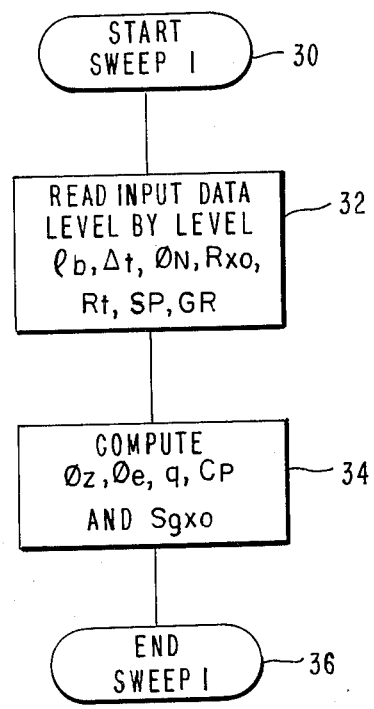
FIGS. 2 and 3 are diagrammatic representations of a computer program flow charts for carrying out the invention utilizing a general purpose digital computer.

Referring now to FIG. 2, there is shown a flow diagram for implementing this invention through the use of an appropriately programmed digital computer. The bulk compressibility and shear modulus are computed by running two sweeps through the data. The first sweep is for the purpose of obtaining values for $\phi_z$, $\phi_e$, $q$, $C_p$ and $S_{oxo}$ using the techniques of the above-referenced Tixier patent. These values are then used in a second sweep of the data to obtain the desired elastic properties of the formation. The output of the program can be a listing of the various parameters computed for each depth level and a log showing the continuous variation of the parameters as a function of depth.

The first sweep of the program is entered, block 30, and the data derived from the well-logging tool is read on a level-by-level basis, block 32. Values for $\phi_z$, $\phi_e$, $q$ $C_p$ and $S_{oxo}$ are computed for each depth level, block 34 using the techniques disclosed in the referenced Tixier patent and the first sweep ends, block 36.

Figure 3:
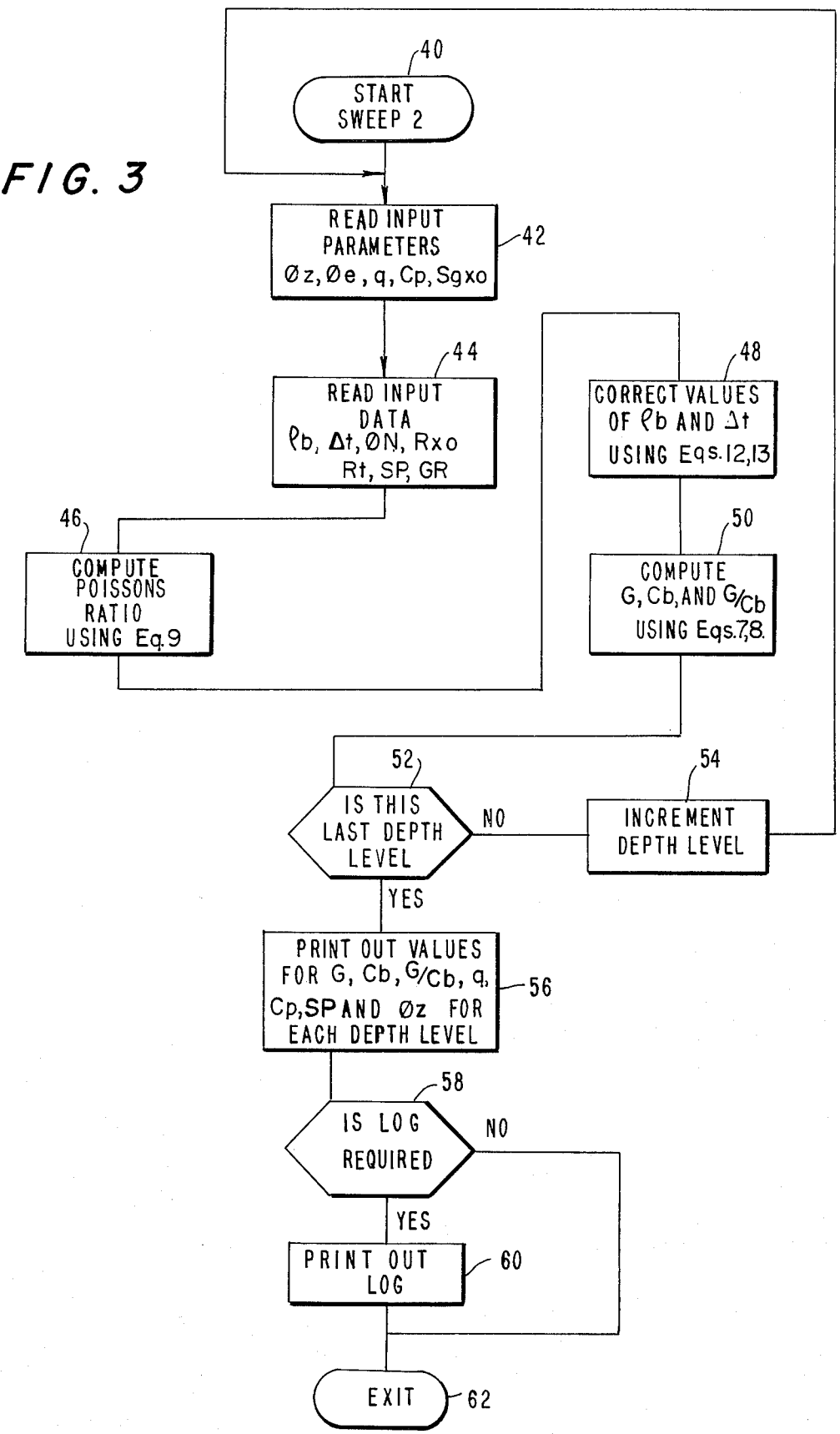

Sweep 2 is shown in FIG. 3. The sweep is entered, via block 40, after which the input parameters for the first depth level, $\phi_z$, $\phi_e$, $q$, $C_p$ and $S_{oxo}$ computed in sweep 1 are read, block 42. Next, the input data for the level is read, block 44 and Poisson's ratio is computed using equation 9, block 46. The values of $\rho_b$ and $\Delta t$ are then corrected for hydrocarbons using equations 12 and 13, block 48. The value G and $c_b$ are then computed using equations 7 and 8 and the ratio $G/c_b$ taken, block 50.

If this is not the last depth level, NO answer from decision element 52, the depth level is incremented by one, block 54, the program returns to block 42 to analyze the next depth level. When all the depth levels have been analyzed, YES answer from decision element 52, values for G, $c_b$, $\phi_z$, $\phi_e$, $C_p$, $G/c_b$ are printed out for each depth level in the borehole, block 56. If a continuous log is required, YES answer from decision element 58, the log is printed out, as represented by block 60, and in either case, the program exits block 62.

Figure 4:
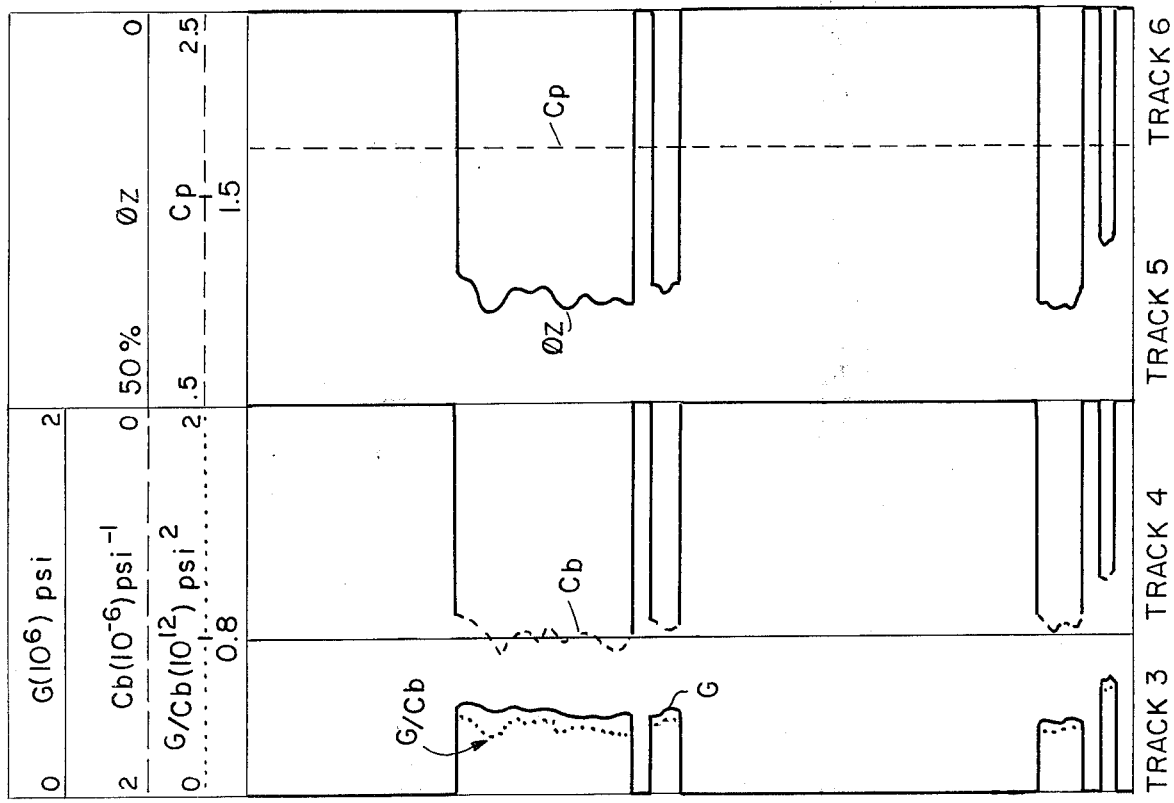
FIG. 4 shows examples of typical logs which can be obtained through the practice of the present invention.
Figure 4:
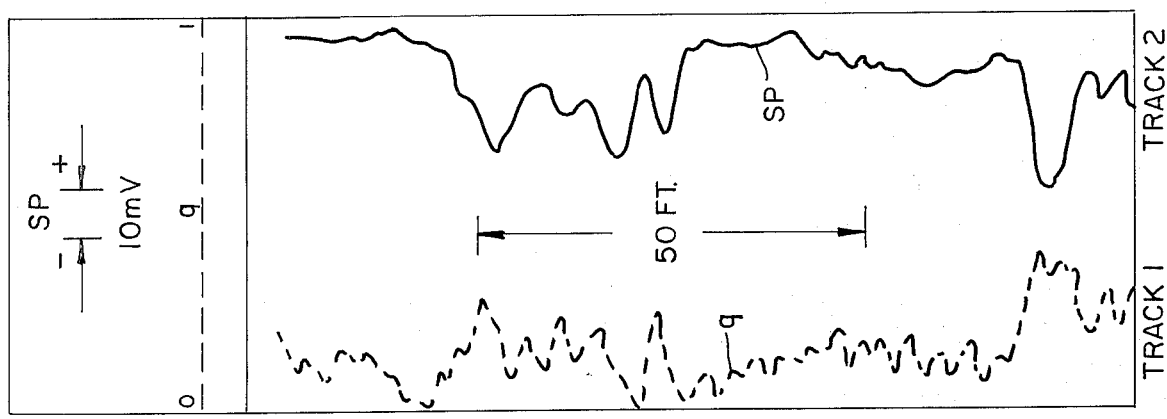

Referring now to FIG. 4, there is shown a typical log of the curves which could be obtained in typical formations when utilizing the techniques of the present invention. Tracks 1 and 2 show the shaliness index and SP logs respectively. The computed value of the shear modulus, G and the computed ratio of the shear modulus to computed bulk compressibility are recorded on track 3, while track 4 has a recording of the computed bulk compressibility. The computed values of $\phi_z$ and $C_p$ are shown on tracks 5 and 6.

Figure 5:
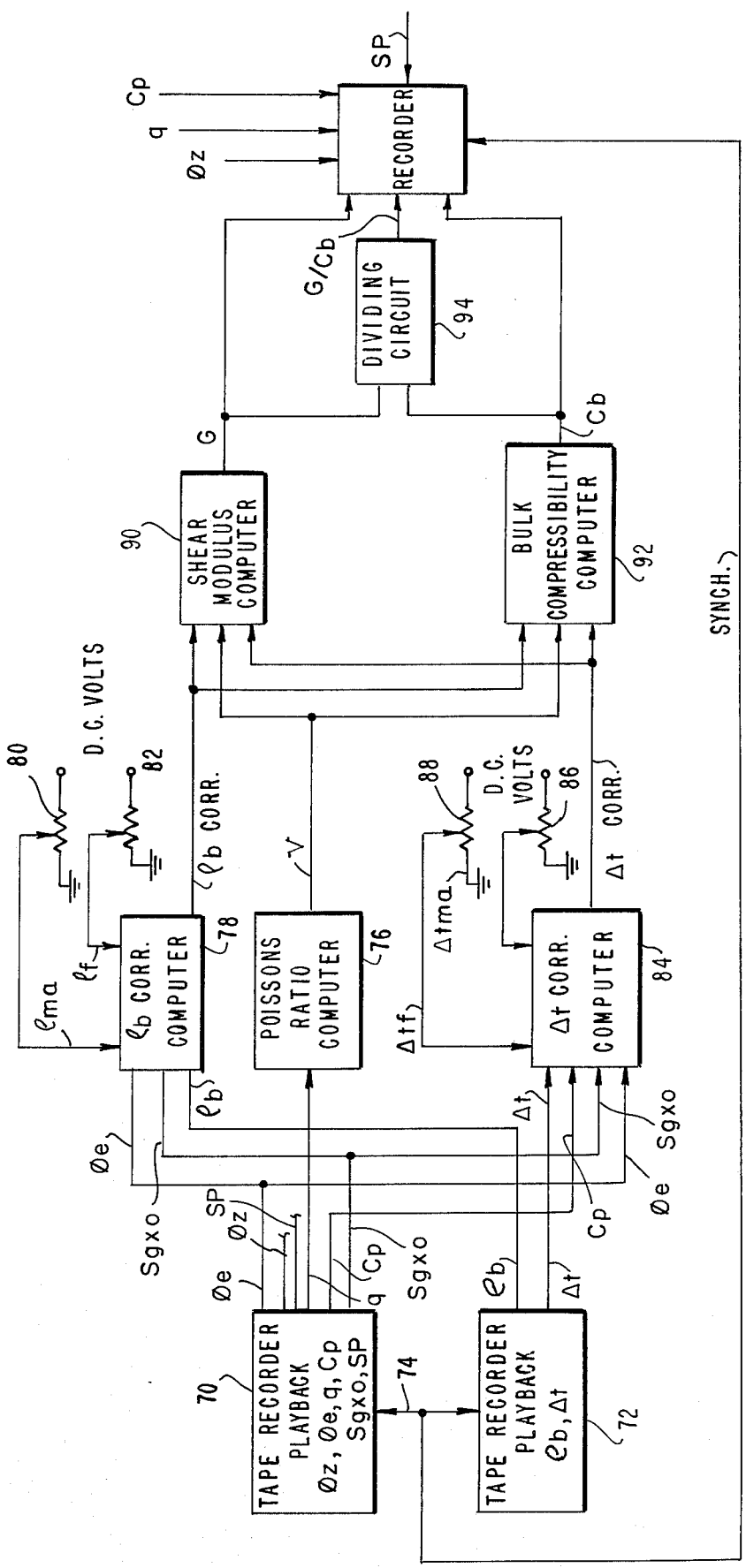

Referring now to FIG. 5, there is shown a special purpose analog computer for carrying out the invention. It will be understood that prior to utilizing the analog computer shown in FIG. 5, the well-logging data derived from the borehole is processed in accordance with the techniques of the Tixier U.S. Pat. No. 3,638,484 to provide values for $\phi_z$, $\phi_e$, $q$, $C_p$ and $S_{oxo}$ for each depth level of the formation and that these values are stored on magnetic tape for playback on tape recorder playback 70. Similarly, well-logging data $\rho_b$ and $\Delta t$ for each depth level is stored on tape for playback on tape recorder playback 72. Operation of the two tape recorder playbacks are synchronized, as indicated schematically by line 74 as is well known in the art by having one motor drive both playbacks or utilizing shychronizing pulses so that there is simultaneous playback of data and input parameters for the same depth level. It will also be understood that the data from the borehole measurements could be merged with the derived parameters onto a single tape prior to utilization in the analog computer in which event only one tape recorder playback is required.

To process the data using this analog computer, the tape recorders are stated and the well-logging data and computed parameters are applied to the various computer circuits. All of the circuits contain various combinations of multiplication, division, addition and subtraction and other well-known circuits which can be combined in accordance with well-known techniques to solve various equations and produce the desired results.

The value of the $q$ computed during the prior computation is applied from tape recorder playback 70 to Poisson Ratio Computer 76 which contains conventional circuits for computing the value of Poisson's ratio in accordance with the equation. 9. As shown in greater detail in FIG. 6, the value of $q$ is first applied to a multiply circuit 100 in Poisson's Ratio Computer 76 where it is multiplied by a signal proportional to a constant 0.125. The resultant product, $0.125q$, is added to a signal proportional to 0.27 in addition circuit 102 to produce the signal $0.125q + 0.27$ which is equal to Poisson Ratio.

Similarly, values for $\phi_e$, $S_{oxo}$ and $\rho_b$ are applied to $\rho_{bcorr}$ computer 78, along with signals representative of the constants $\rho ma$ and $\rho_f$ derived from resistive networks 80 and 82. The $\rho_{bcorr}$ computer is arranged to compute the value of $\rho_{bcorr}$ in accordance with Equation 13 and is shown in greater detail in FIG. 7. Referring to FIG. 7, the signals representative of constants $\rho ma$ and $\rho_f$ are applied to subtraction circuit 110 which produces an output representative of the value $\rho ma - \rho_f$. Signals representative of the values of $\phi_e$ and $S_{oxo}$ are multiplied in multiply circuit 112 and the output signal, $\phi_e S_{oxo}$, multiplied by the signal representative of $\rho ma - \rho f$ in multiply circuit 114. The output signal from multiply circuit 114, $\phi_e S_{oxo} (\rho ma - \rho f)$ is multiplied by 0.5 in curcuit 116 and added to the value of $\rho_b$ derived from the log data in addition circuit 118 to produce an output signal indicative of the corrected value of $\rho_b$ in accordance with Equation 13.

The inputs to the $\Delta t_{corr}$ computer 84 from the playback are $\Delta t$, $C_p$, $\phi_e$ and $S_{oxo}$. In addition, signals representative of constants $\Delta t_f$ and $\Delta t_{ma}$ derived from resistive networks 86 and 88 are applied to the computer which is arranged to compute the value of $\Delta t_{corr}$ in accordance with equation 12. Referring now to FIG. 8, the $\Delta t_{corr}$ computer is shown in greater detail. Signals representative of $\Delta t_f$ and $\Delta t_{ma}$ are subtracted in subtraction circuit 120; the signal representative of the constant 1 is subtracted from the value of $C_p$ in subtraction circuit 122 and the output multiplied by $C_p$ in multiply circuit 124 to produce a signal representative of $C_p (C_p - 1)$; and $\phi_e$ and $S_{oxo}$ are multiplied in multiply circuit 126. Signals from circuits 120, 124 and 126 representative of $(\Delta t_f - \Delta t_{ma})$, $C_p (C_p - 1)$ and $\phi_e^x S_{oxo}$ respectively are multiplied together in multiply circuit 128 to produce an output signal representative of $C_p (C_p - 1) \phi_e S_{oxo} (\Delta t_f - \Delta t_{ma})$ which is subtracted from a signal representative of the value of $\Delta t$ derived from the log data in subtraction circuit 130 to produce an output signal representative of the corrected value of $\Delta t$, i.e. $\Delta t_{corr}$ in accordance with Equation 12.

The computed values of $\nu$, $\rho_{bcorr}$, and $\Delta t_{corr}$ are applied to shear modulus computer 90, which is arranged to compute the shear modulus in accordance with Equation 7, and to the bulk compressibility computer 92, which is arranged to compute the bulk compressibility in accordance with Equation 8.

REferring first to FIG. 9, there is shown the shear modulus computer in greter detail. The signal representative of the value of Poisson's Ratio is first multiplied by 2 by circuit 140 and this signal subtracted from a signal representative of the constant 1 in subtraction circuit 142 to produce a signal, $(1-2\nu)$. Poisson's ratio is also subtracted from a signal representative of the constant 1 in substraction circuit 144 and this result, $(1-\nu)$ multiplied by 2 in circuit 146 to produce a signal representative of the value of $2(1-\nu)$ which is applied to divide circuit 148 together with the signal $(1-2\nu)$ to produce an output signal representative of the value of A in Equation 7. The signal representative of the value of A is multiplied by the corrected value of $\rho_b$ in multiply circuit 150. The signal representative of the corrected value of $\Delta t$ is first squared in squaring circuit 152 and the output of the squaring circuit $\Delta t_{corr}^2$ is applied along with the output of multiply circuit 150, A $\rho_{bcorr}$ to divide circuit 154 which produces an output signal representative of the shear modulus, G, according to Equation 7.

Referring now to FIG. 10, the bulk compressibility computer is shown in detail. A signal representative of Poisson's ratio is applied to adition circuits, 160 and subtraction circuit 162 where it is respectively added to and subtracted from a signal representative of the constant 1. The output signal from subtraction circuit 162, $(1-\nu)$, is multiplied by 3 as represented by 164 and the output $3(1-\nu)$ along with the signal $1 + \nu$ is applied to divide circuit 166 whose output is representative of the variable B in Equation 8. The signal, B, is multiplied by a signal representing the corrected value of $\rho_b$, $\rho_{bcorr}$, in multiply circuit 168. A signal representing the corrected value of $\Delta t$, $\Delta t_{corr}$, is first squared in squaring circuit 170 to produce a signal, $\Delta t_{corr}^2$ which, along with the output of multiply circuit 168, $\rho_{bcorr}$ is applied to divide circuit 172 to produce the output signal representative of bulk compressibility in accordance with Equation 8. The bulk modulus, K, can be obtained by inverting the signal, $C_b$, in an inverter which is not shown.

The computed values of G, and $C_b$ are applied to divide circuit 94 which produces an output signal representative of the value of $G/c_b$ which along with the values representative of $G_1/C_b$, $\phi_e$, $\phi_z$, $q$, $C_p$, $S_{oxo}$, $\rho_b$ and $\Delta t$ are applied to a recorder 96 which produces a continuous recording of the variables as a function of depth such as shown in FIG. 4. The recorder is controlled by a signal from the tape recorder playbacks to insure that its operation is synchronized with the tape recorder drives.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What I claim is:

1. A machine method of determining elastic constants indicative of the strength of an earth formation traversed by a borehole, comprising the steps of:
    a. providing a plurality of well-logging measurements indicative of a plurality of properties of the formation at selected depth levels;
    b. combining at least some of said measurements to provide a first parameter indicative of the shale content of the formation at selected depth levels;
    c. producing a representation of Poisson's ratio at selected depth levels from said first parameter; and
    d. combining at least some of said well-logging measurements with said representation of Poisson's ratio to determine at least one of the elastic constants of the formation surrounding said borehole.

2. The method of claim 1 wherein said well-logging measurements include measurements of bulk density and acoustic travel time, and further including the step of correcting at least one of said bulk density and acoustic travel time measurements for the presence of hydrocarbons.

3. The method of claim 1 wherein said elastic constant is the shear modulus of said formation.

4. The method of claim 1 wherein said elastic constant is the bulk compressibility of said formation.

5. The method of claim 1 wherein said elastic constant is the ratio of the shear modulus to the bulk compressibility of the formation.

6. The method of claim 1 wherein the parameter indicative of the shale content of the formation is the shale index.

7. The method of claim 6 wherein Poisson's ratio is computed according to the formula:

$$\nu = Aq + B$$

where:
$A$ and $B$ are constants,
$q$ is the shale index and
$\nu$ is Poisson's ratio.

8. Apparatus for determining elastic constants indicative of the strength of an earth formation traversed by a borehole comprising:
   a. means for providing a plurality of well-logging measurements indicative of a plurality of properties of the earth formation at selected depth levels;
   b. means for combining at least some of said measurements to provide a first parameter indicative of the shale content of the formation at selected depth levels;
   c. means for producing a representation of Poisson's ratio at selected depth levels from said first parameter; and
   d. means for combining at least some of said well-logging measurements with said representation of Poisson's ratio to determine at least one of the elastic constants of the formation surrounding said borehole.

9. The apparatus of claim 8 wherein said well-logging measurements include measurements of bulk density and acoustic travel time, and further including means for correcting at least one of said bulk density and acoustic travel time measurements for the presence of hydrocarbons.

10. The apparatus of claim 8 wherein said elastic constant is the shear modulus of said formation.

11. The apparatus of claim 8 wherein said elastic constant is the bulk compressibility of said formation.

12. The apparatus of claim 8 wherein said elastic constant is the ratio of the shear modulus to the bulk compressibility of the formation.

13. The apparatus of claim 8 wherein the parameter indicative of the shale content of the formation is the shale index.

14. The apparatus of claim 13 wherein Poisson's ratio is computed according to the formula:

$$\nu = Aq + B$$

where:
$A$ and $B$ are constants,
$q$ is the shale index and
$\nu$ is Poisson's ratio.

* * * * *